July 12, 1960 R. C. P. HINTON ET AL 2,945,221
TAPE TO CARD CONVERTER
Filed June 27, 1956
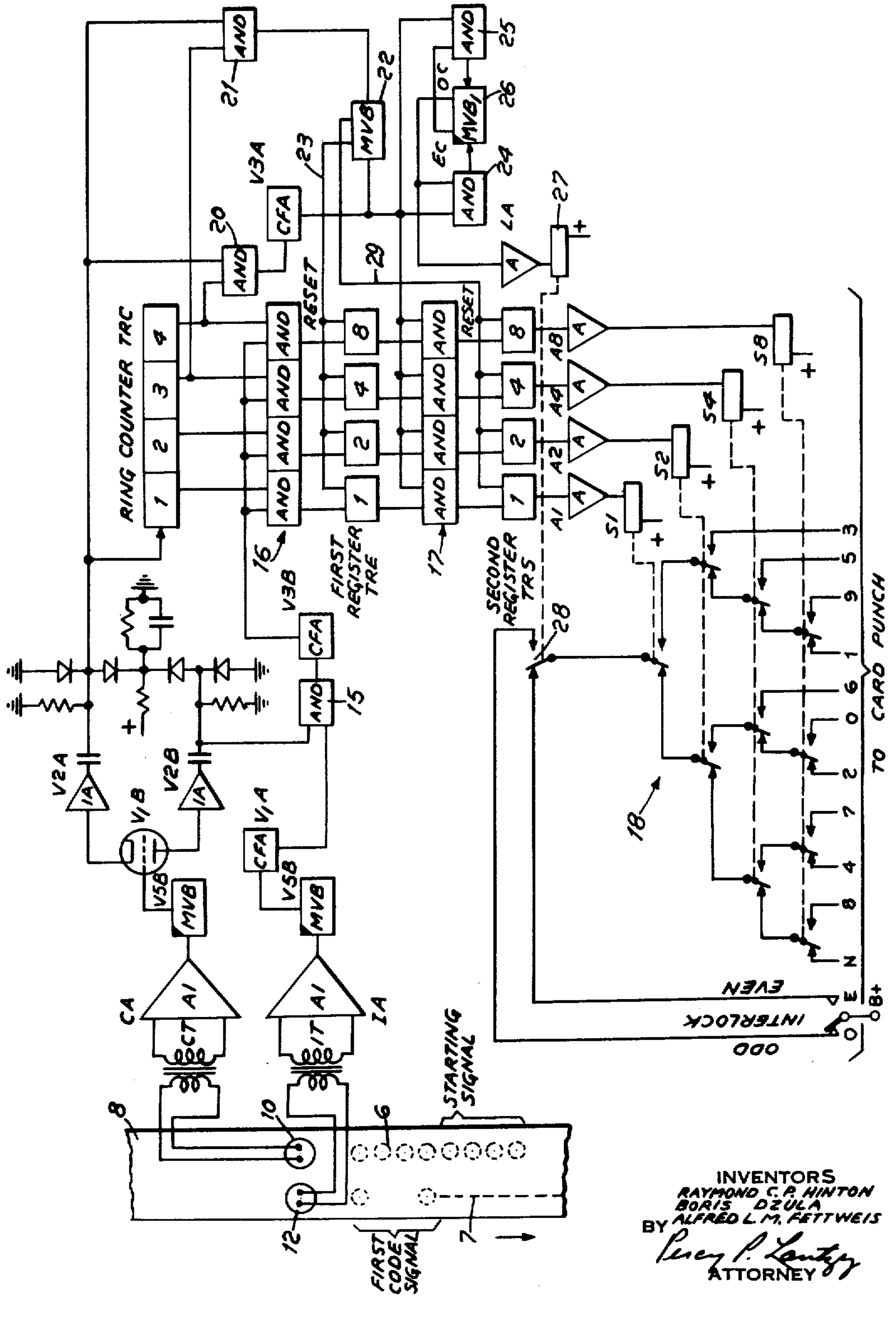
INVENTORS
RAYMOND C. P. HINTON
BORIS DZULA
ALFRED L. M. FETTWEIS
BY Percy P. Lantzy
ATTORNEY

United States Patent Office 2,945,221

Patented July 12, 1960

2,945,221

TAPE TO CARD CONVERTER

Raymond C. P. Hinton, Teaneck, Boris Dzula, Clifton, and Alfred L. M. Fettweis, Nutley, N.J., assignors to International Telephone and Telegraph Corporation, Nutley, N.J., a corporation of Maryland Filed June 27, 1956, Ser. No. 594,187

11 Claims. (Cl. 340—347)

This invention relates to automatic message recording systems and more particularly to improvements in converting a recording of code signals into decimal form.

Various arrangements have been proposed heretofore for converting data recorded on a magnetic tape into the form required by conventional card punching business machines. Such arrangements, however, are objectionable either because of the amount of equipment required or because tape motion must be interrupted.

One of the objects of this invention is to provide means to transfer code signals from a tape recording to a register; another object is to provide an improved code to decimal converter; and still another object is to convert code signals detected on a tape recording into decimal or other suitable form without interrupting movement of the tape.

One of the features of the converter system of this invention is the arrangement of the recording in two tracks on the tape, one track containing bits of code signals arranged in serial order and the other having sync signals corresponding to the bit positions of the code. The system includes a first detector for detecting sync signals and a second detector for detecting bits of code signal on said tape while the tape is driven continuously past said detectors. An electronic counter is provided having a step position for each bit position of the code to which the detected sync signals are applied. Associated with each step position is a coincident gate to which each code bit is applied, whereby coincidence between a code bit and an operated position of said counter will open the corresponding gate to pass the signal bit to a first register which has a plurality of cells, each coupled to one of said gates. A second register having cells corresponding to the cells of the first register is also provided together with means under control of operation of the final step position of said counter to transfer a registered code signal from the first register to the second register. Coupled to each cell of the second register is a corresponding conversion means or relay which is in turn associated with a matrix of contacts or other switching devices arranged for conversion of a registered code signal into decimal or other suitable form. Operation of the last step position of the counter effects operation of the conversion means in accordance with the bits of code signal registered in the second register for application to a card punching machine. The second register is reset upon operation of a step position preceding the final step position and the first register is reset following transfer of information therefrom to the second register.

The above-mentioned and other features and objects of this invention will become more apparent by reference to the following description taken in conjunction with the accompanying drawing wherein the single figure is a schematic block diagram representation of the converter of this invention.

*Explanation of circuit components and conventions*

In the detailed description of the embodiment illustrated certain circuit components of constructions known in the art have been depicted in block schematic form to simplify both the drawing and the description. These components include cathode followers, inverters, flip-flop circuits, amplifiers, counting chains, registers, multivibrators and gate circuits.

The cathode followers employed are of types known to the art and are identified as CF with designation of the particular cathode follower shown outside the symbol. Cathode followers may be high or low output circuits, the CFA include a tube such as on section of a 12AU7 double triode having direct current inputs. CFB cathode followers are the same as CFA cathode followers but with alternating current circuit inputs and with a varistor in the output circuit poled to permit passage of negative pulses, so that a number of such output circuits can be connected in parallel.

The multivibrators employed in the circuit description are of the bistable type, and are identified on the drawings as MVB. The MVB multivibrators may advantageously be conventional double stability twin-triode vacuum tube stages. In the drawing, one of the upper corners of each MVB circuit is shown shaded to indicate the plate of the normally conducting triode. Further the plate output leads are depicted as emanating only from the top of the block schematic representing multivibrators while the tripping and resetting signals are applied to the ends of the blocks.

The multivibrators identified as MVB may advantageously be cold cathode gas tubes coupled as ring counters.

The inverters employed in the circuit description are identified in the drawing as IA. These inverters may advantageously be single triodes normally biased to saturation and with the input alternating current coupled through a capacitator.

The amplifiers are identified as A and A1. The A amplifiers may advantageously be a triode such as one section of a 12AT7 having direct current inputs.

A1 may be a conventional four stage low frequency high gain amplifier having a transformer coupled input.

The gate circuits employed include AND or OR circuits, which may comprise diodes, such as vacuum tubes, varistors or oxide rectifiers, connected together so as to allow passage of a positive and negative potential only when this potential appears on all input leads to the circuit or when the potential appears on any one input lead as is known in the art.

The ring counter TRC comprises a number of single component stages or cells each of which is capable of assuming one of two conditions, on or off. The counter is shown as a series of cells side-by-side, with an input for the first cell and an output for each cell. The counter counts to the end of its cycle and is then automatically reset to start the next cycle by the next signal pulse. Each appearance of the signal pulse on the input causes a change from one stable state to the next in the direction of the arrowhead on the input. The cells of the counter may advantageously be cold cathode gas tubes.

A register is shown in a similar manner to a counter but the cells are shown separated. The cells of registers TRE and TRS may also be cold cathode gas tubes with the input coupled through a capacitator.

*General description*

In the illustrated embodiment, two parallel tracks are recorded on a magnetic tape 8. Information is recorded in one track 7 in a code which may be binary or other type so long as the signal bits may be recorded in serial order. Sync signals are recorded in the other track 6, one sync signal being provided for each signal bit position in the code. The tape reader has two reading heads 10 and 12 for reading the recording on the parallel tracks 6 and 7. In the example shown, a four position binary code is employed. The reading head 10 is coupled through transformer CT, amplifier CA, multivibrator V5B, triode V1B and inverter V2A to a counter chain TRC. The other reading head 12 is coupled through transformer IT, amplifier IA, multivibrator V5B, cathode follower VIA, coincident gate 15 and cathode follower V3B to each of the coincident gates indicated at 16. The sync pulses cause the counting chain to step from one operating position to the next through a code cycle. The counting positions of the counting chain TRC are coupled to the corresponding coincident gates 16 which are in turn coupled to corresponding cells of a first register TRE. Sync pulses are also applied to gate 15 through inverter V2B to pass only signal bits to the gates 16. The gate 15 is conditioned by the sync pulse from the inverter V2B and the signal bit pulse from the cathode follower VIA. This insures that the output from the "and" gate 15 occurs only during the coincidence of a sync pulse and a signal bit pulse. The cells of the register TRE are in turn coupled to corresponding cells of a second register TRS through a group of coincident gates indicated at 17. The cells of the second register are coupled through amplifiers to relays S1, S2, S4 and S8, which have associated therewith a matrix of contacts such as indicated at 18 to effect conversion of the code signal registered into decimal form for application to a card punching machine.

While a relay matrix has been shown by way of example, it should be understood that other conversion matrix arrangements may be used if desired. For example, a rectifier matrix operating cold cathode tubes, thyratrons or hard vacuum tubes would perform satisfactorily. Furthermore, while translation to decimal code is used for illustration, other translations such as alphanumeric, for example, are contemplated.

The register control including the transfer from the first register to the second and from the second through the relays to the card punching machine and also the resetting of both registers are performed by the following equipment. The sync pulses are applied in parallel to gates 20 and 21 to which ring counter cells 4 and 3 are coupled, respectively. Coincidence between operation of cell 4 and the corresponding sync pulses operates gate 20 to pass a pulse to the cathode follower V3A. Likewise coincidence between operation of counting cell 3 and the corresponding sync pulse operates gate 21 to apply a pulse to the multivibrator 22. The other input to the multivibrator is coupled to the output of the cathode follower V3A which is also coupled to gates 17 to effect transfer of registered information from the first register to the second register upon completion of the counting operation of cell 4. Since the multivibrator 22 has a time lag in operation the transfer of information will have been effected before the multivibrator applies a reset potential over line 23 to the first register. A pulse from cathode follower V3A is also applied to coincident gates 24 and 25 which in turn apply pulses to the bistable multivibrator 26 for operation in a direction dependent upon the existing condition of the multivibrator. Normal operation of the multivibrator 26 controls the interlock relay 27. Associated with the interlock relay is a contact 28 which dependent on the operating condition of the multivibrator 26 connects the matrix to the odd or even power supply which controls conduction through the matrix to the input of the card punching machine.

This arrangement actuates the card punch to record the information set up in the matrix 18. During the time the card punch is operating, the succeeding digit of code information may be received by the first register. When the counter operation reaches the cell 3, the multivibrator 22 is operated to apply a potential over line 29 thereby causing the second register and associated relays to restore to normal. In this manner one code signal or digit after another is read off the tape, and recorded in decimal form by a card punching machine. The card punching machine is capable of operating at a higher speed than the reader which allows simultaneous operation of the card punching machine and the reader while only one storage operation is required.

The card punching machine (not shown) is controlled by the interlocking arrangement in the following manner: The machine is initially in a position to punch column 1 on a card and with the power supply for operation of the punch magnets switched to the odd column conductor O. The multivibrator 26 of the converter initially has EC conducting, hence relay 27 is not energized. The first information pulse is preceded by four sync pulses causing cell 4 of the counting chain to transmit a pulse via gate 20, V3A and gate 25 to multivibrator 26 causing a potential to be applied over OC through an amplifier to relay 27. A circuit is now completed via the front contacts of relay 27 from the power supply over terminal O of the card punching machine to the appropriate punch magnets via the relay matrix 18 whereby the magnets operate and punch a starting "dash" in the first column. The system is now in condition to transfer coded information to the punching machine.

The card punching machine after punching the starting "dash" switches the supply to the even column conductor E and remains in this condition until the first code signal has been read off the tape, stored on register TRS and decoded by relays S1, S2, S4 and S8. The fourth operating position of counter TRC triggers through gate 24 to effect operation of the multivibrator 26 to apply a potential over EC thus de-energizing relay 27 and closing the contacts for circuit E to the punch machine. The card punching machine now records the first code signal established on the matrix 18 and switches the power supply to the odd conductor O. The interlocking arrangement will operate in this manner until the data for a card is completed, and a new card is fed into the card machine. As the card punching machine is operated at a higher speed than the reader, only one storage operation is required to provide simultaneous operation of the reader and card punching machine.

When magnetic tape is to be processed it is driven past the reading heads 10 and 12 at a rate of one-half inch per second. This speed with reference to the speed of recording on magnetic tape, which is normally fifteen inches per second, amounts to a reduction of 30 to 1.

While we have described above the principles of our invention in connection with specific apparatus, it is to be clearly understood that this description is made only by way of example and not as a limitation to the scope of our invention as set forth in the objects thereof and in the accompanying claims.

We claim:

1. A device for transferring code signals from a tape to a register wherein the tape is provided with two tracks of recordings, one track containing bits of code signals arranged in serial order and the other having sync signals corresponding to the bit positions of the code; comprising a first detector for detecting sync signals on said tape, a second detector for detecting bits of code signal on said tape, means to drive said tape past said detectors, an electronic ring counter having a step position for each bit position of said code, means to apply the detected sync signals from said first detector to said counter, a plurality of gates corresponding in number to the number of said step positions, means coupling said counter to said gates to apply a potential to each gate when the counter is stepped to the corresponding position, a register having a plurality of cells, each coupled to the output of one of said gates, and gating means to apply the code bits from said second detector to each of said gates whereby coincidence between a code bit and an operated position potential of said counter will cause the corresponding gate to conduct said bit to a corresponding cell of said register and means connected to the register and ring counter for resetting said register for registration of a succeeding code signal.

2. In a system for converting code signals into signals of another form wherein each bit position of a code signal has a corresponding sync signal; a first detector to detect said sync signals, a second detector to detect in serial order the bits of said code signal, an electronic ring counter having a step position for each bit position of said code, means to apply the detected sync signals from said first detector to said counter, a plurality of gates corresponding in number to the number of said step positions, means coupling said counter to said gates to apply a potential to each gate when the count is stepped to the corresponding position, a register having a plurality of cells one for each bit position of said code, each of said cells respectively coupled to the output of one of said gates, means to apply the code bits from said second detector to each of said gates whereby coincidence between a code bit and an operated position potential of said counter will cause the corresponding gate to conduct said bit to a corresponding cell of said register, conversion means having a switching matrix arranged for conversion of the bits of a registered code signal into signals of another form, and means coupling the cells of said register to corresponding ones of said conversion means to effect switching operation according to the bits of the code signal registered and means connected to the register and ring counter for resetting said register for registration of a succeeding code signal.

3. In a system for converting code signals into signals of another form wherein each bit position of a code signal has a corresponding sync signal; a first detector to detect said sync signals, a second detector to detect in serial order the bits of said code signal, a register having a plurality of cells one for each bit position of said code, a ring counter having cells corresponding to the cells of said register, electronic gates coupling the cells of said ring counter to the corresponding cells of said register, means coupling the output of said first detector to said ring counter, means coupling the output of said second detector to each of said electronic gates whereby coincidence at one of said gates of a signal bit and the energization potential of an associated ring counter cell effects registration of said signal bit in the corresponding register call, conversion means having a switching matrix of contacts arranged for conversion of the bits of a registered code signal into signals of another form, and means coupling the cells of said register to corresponding ones of said conversion means to effect switching operation according to the bits of the code signal registered.

4. A system according to claim 3, further including means responsive to energization of the last cell of said ring counter to reset said register for registration of the next succeeding code signal.

5. In a system for converting code signals into signals of another form wherein each bit position of a code signal has a corresponding sync signal; a first detector to detect said sync signals, a second detector to detect in serial order the bits of said code signal, a register having a plurality of cells one for each bit position of said code, a ring counter having cells corresponding in number to the cells of said register, electronic gates to couple the cells of said ring counter to the corresponding cells of said register, means coupling the output of said first detector to the first cell of said ring counter, an input gate coupled in parallel to said electronic gates, means coupling the outputs of said first and second detectors to said input gate for passing of the bits of a code signal only to said electronic gates whereby coincidence at one of said electronic gates of a signal bit and the energization potential of an associated ring counter cell effects registration of said signal bit in the corresponding register cell, conversion means having a switching matrix arranged for conversion of the bits of a registered code signal into signals of another form, and means coupling the cells of said register to corresponding ones of said conversion means to effect switching operation according to the bits of the code signal registered and means connected to the register and ring counter for resetting said register for registration of a succeeding code signal.

6. In a system for converting code signals into signals of another form wherein each bit position of the code signal has a corresponding sync signal; a register having a plurality of cells one for each bit position of said code, a ring counter having cells corresponding in number to the cells of said register, electronic gates to couple the cells of said ring counter to the corresponding cells of said register, means to apply sync signals to the first cell and said counting chain, means to apply each signal bit to each of said electronic gates whereby coincidence at one of said gates of a signal bit and the energization potential of an associated ring counter cell effects passage of said signal bit to the corresponding register cell, conversion means having a switching matrix of contacts for conversion of the bits of a registered code signal into signals of another form, and means coupling the cells of said register to corresponding ones of said conversion means to effect switching operation according to the bits of the code signal registered and means connected to the register and ring counter for resetting said register for registration of a succeeding code signal.

7. In a system for converting code signals into signals of another predetermined form wherein each bit position of a code signal has a corresponding sync signal; first and second registers each having a plurality of cells corresponding in number to the number of bit positions in said code, gating means responsive to coincidence of a sync signal and a bit signal to apply each bit signal to the corresponding cell of said first register including two paths each having a multivibrator, a common "AND" gate connected thereto, a plurality of conversion devices having a switching matrix, said devices being arranged so that each device is coupled to a corresponding cell of said second register and the outputs of the matrix provide in accordance with operation of said devices a conversion of the code signal registered into said predetermined form at the output of said matrix, and means responsive to said sync signals upon completion of the registration of a code signal to transfer the registered code signal from said first register to said second register and to reset said first register for a new registering operation.

8. In a system for converting code signals into signals of another predetermined form wherein each bit position of a code signal has a corresponding sync signal; a ring counter, first and second registers, said registers and said ring counter each having a plurality of cells corresponding in number to the number of bit positions in said code, means to apply said sync signals to the first cell of said ring counter, means under control of said ring counter to apply each signal bit to the corresponding cell of said first register, gating means responsive to energization of the last two cells of said ring counter to transfer the bits of a registered code signal from said first register to said second register and to reset first register for a new registering operation, a plurality of conversion means having a switching matrix, said plurality of conversion means being arranged so that each one thereof is coupled to a corresponding cell of said second register and the outputs of the matrix provide in accordance with switching operation thereof a conversion of a code signal registered into said predetermined form at the output of said matrix.

9. A converter for converting code signals from a tape into signals of another predetermined form wherein the tape is provided with two tracks of recordings, one track containing bits of code signals arranged in serial order and the other having sync signals corresponding to the bit positions of the code; comprising a first detector for detecting sync signals on said tape, a second detector for detecting bits of code signal on said tape, means to drive said tape past said detectors, an electronic ring counter having a step position for each bit position of said code, means to apply the detected sync signals from said first detector to said counter, a plurality of gates corresponding in number to the number of said step positions, means to apply the code bits from said second detector to each of said gates whereby coincidence between a code bit and an operated position of said counter will cause the corresponding gate to conduct said bit, a register having a plurality of cells, each coupled to one of said gates, a plurality of conversion means, each said means corresponding to each cell of said register, said conversion means having a switching matrix arranged for conversion of a registered code signal to a corresponding value in said predetermined form, and gating means and multivibrators activated by operation of the last position of said ring counter to effect operation of said conversion means in accordance with the bits of code signal registered.

10. A converter for converting code signals from a tape into signals of another predetermined form wherein the tape is provided with two tracks of recordings, one track containing bits of code signals arranged in serial order and the other having sync signals corresponding to the bit positions of the code; comprising a first detector for detecting sync signals on said tape, a second detector for detecting bits of code signal on said tape, means to drive said tape past said detectors, an electronic ring counter having a step position section for each bit position of said code, means to apply the detected sync signals from said first detector to said counter, a plurality of gates each coupled to a section of said counter, means to apply the code bits from said second detector to each of said gates whereby coincidence between a code bit and an operated position of said ring counter will cause the corresponding gate to conduct said bit, a register having a plurality of cells, each coupled to one of said gates, a plurality of conversion devices one corresponding to each cell of said register, said devices having a switching matrix arranged for conversion of a registered code signal to a corresponding value in said predetermined form, gating means and multivibrators activated by operation of the final step position of said counter to effect operation of said devices in accordance with the bits of code signal registered for application to a utility device, and means responsive to operation of said final step position to effect transfer of information from said register to said devices.

11. A converter for converting code signals from a tape into signals of another predetermined form wherein the tape is provided with two tracks of recordings, one track containing bits of code signals arranged in serial order and the other having sync signals corresponding to the bit positions of the code; comprising a first detector for detecting sync signals on said tape, a second detector for detecting bits of code signal on said tape, means to drive said tape, past said detectors, an electronic ring counter having a step position section for each bit position of said code, means to apply the detected sync signals from said first detector to said ring counter, a plurality of examination gates each coupled to a section of said ring counter, a coincident gate coupled to the outputs of said first and second detectors and responsive to coincidence of sync and code bits to apply the code bits to each of said examination gates whereby coincidence between a code bit and the operated position of said counter will cause the corresponding examination gate to conduct said bit, a first register having a plurality of cells, each coupled to one of said examination gates, a second register having cells corresponding to said first register, a plurality of conversion devices one corresponding to each cell of said second register, said devices having a switching matrix arranged for conversion of a registered code signal into said predetermined form, coincidence gates means initiated by operation of the final step position of said ring counter to effect operation of said devices in accordance with the bits of code signal registered in said second register for application to a utility device, register re-setting means operable in response to operation of a step position of said counter other than said final step position to reset said second register and said devices for a new registering operation, and means responsive to operation of said final step position to effect transfer of information from said first register to said second register and to thereafter reset said first register.

References Cited in the file of this patent

UNITED STATES PATENTS

| | | |
|---|---|---|
| 2,539,014 | Frantz | Jan. 23, 1951 |
| 2,686,299 | Eckert | Aug. 10, 1954 |
| 2,693,593 | Crosman | Nov. 2, 1954 |
| 2,708,267 | Weidenhammer | May 10, 1955 |
| 2,769,968 | Schultheis | Nov. 6, 1956 |
| 2,770,415 | Lindesmith | Nov. 13, 1956 |
| 2,771,596 | Bellamy | Nov. 20, 1956 |

OTHER REFERENCES

Publ. I: Proceedings of I.R.E., vol. 44, Issue 2, pages 154–162, February 1956.